(12) United States Patent
Shieh et al.

(10) Patent No.: US 10,178,070 B2
(45) Date of Patent: Jan. 8, 2019

(54) METHODS AND SYSTEMS FOR PROVIDING SECURITY TO DISTRIBUTED MICROSERVICES

(71) Applicant: vArmour Networks, Inc., Mountain View, CA (US)

(72) Inventors: Choung-Yaw Shieh, Palo Alto, CA (US); Marc Woolward, Santa Cruz, CA (US)

(73) Assignee: vArmour Networks, Inc., Mountain View, CA (US)

( * ) Notice: Subject to any disclaimer, the term of this patent is extended or adjusted under 35 U.S.C. 154(b) by 0 days.

(21) Appl. No.: 14/657,282

(22) Filed: Mar. 13, 2015

(65) Prior Publication Data

US 2016/0269425 A1 Sep. 15, 2016

(51) Int. Cl.
*G06F 21/00* (2013.01)
*H04L 29/06* (2006.01)

(52) U.S. Cl.
CPC ...... *H04L 63/0254* (2013.01); *H04L 63/0263* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 6,226,372 B1 | 5/2001 | Beebe et al. | |
| 6,578,076 B1 | 6/2003 | Putzolu | |
| 6,765,864 B1 | 7/2004 | Natarajan et al. | |
| 6,986,061 B1 | 1/2006 | Kunzinger | |
| 6,992,985 B1 | 1/2006 | Das | |
| 7,028,179 B2 | 4/2006 | Anderson et al. | |
| 7,058,712 B1 | 6/2006 | Vasko et al. | |
| 7,062,566 B2 | 6/2006 | Amara et al. | |
| 7,068,598 B1 | 6/2006 | Bryson et al. | |
| 7,397,794 B1 | 7/2008 | Lacroute et al. | |
| 7,464,407 B2 | 12/2008 | Nakae et al. | |

(Continued)

FOREIGN PATENT DOCUMENTS

TW 201702901 A 1/2017
WO WO2016148874 A1 9/2016

(Continued)

OTHER PUBLICATIONS

Specification, U.S. Appl. No. 14/673,679, filed Mar. 30, 2015.

(Continued)

*Primary Examiner* — Maung T Lwin
(74) *Attorney, Agent, or Firm* — Carr & Ferrell LLP (57) ABSTRACT

Systems for providing security to distributed microservices are provided herein. In some embodiments, a system includes a plurality of microservices, each of the plurality of microservices having a plurality of distributed microservice components. At least a portion of the distributed microservice components execute on different physical or virtual servers in a data center or a cloud. The system also includes a plurality of logical security boundaries, with each of the plurality of logical security boundaries being created by a plurality of enforcement points positioned in association with the plurality of distributed microservice components. Each of plurality of microservices is bounded by one of the plurality of logical security boundaries.

16 Claims, 6 Drawing Sheets

(56) References Cited

U.S. PATENT DOCUMENTS

| | | | |
|---|---|---|---|
| 7,502,841 B2* | 3/2009 | Small | H04L 12/14 709/223 |
| 7,607,170 B2* | 10/2009 | Chesla | H04L 63/1408 709/224 |
| 7,620,808 B2* | 11/2009 | Le | H04L 63/1458 370/237 |
| 7,620,986 B1 | 11/2009 | Jagannathan et al. | |
| 7,735,141 B1 | 6/2010 | Noel et al. | |
| 7,774,837 B2 | 8/2010 | McAlister | |
| 7,849,495 B1 | 12/2010 | Huang et al. | |
| 7,900,240 B2 | 3/2011 | Terzis et al. | |
| 7,904,962 B1 | 3/2011 | Jajodia et al. | |
| 7,949,677 B2 | 5/2011 | Croft et al. | |
| 7,954,150 B2 | 5/2011 | Croft et al. | |
| 8,051,460 B2 | 11/2011 | Lum et al. | |
| 8,250,213 B2 | 8/2012 | Glover et al. | |
| 8,274,912 B2 | 9/2012 | Wray et al. | |
| 8,321,862 B2 | 11/2012 | Swamy et al. | |
| 8,353,021 B1 | 1/2013 | Satish et al. | |
| 8,490,153 B2 | 7/2013 | Bassett et al. | |
| 8,514,868 B2 | 8/2013 | Hill | |
| 8,516,478 B1 | 8/2013 | Edwards et al. | |
| 8,612,744 B2 | 12/2013 | Shieh | |
| 8,612,971 B1 | 12/2013 | Fitzgerald et al. | |
| 8,726,343 B1 | 5/2014 | Borzycki et al. | |
| 8,813,169 B2 | 8/2014 | Shieh et al. | |
| 8,918,785 B1 | 12/2014 | Brandwine et al. | |
| 8,959,568 B2* | 2/2015 | Hudis | G06F 21/552 726/1 |
| 9,038,151 B1 | 5/2015 | Chua et al. | |
| 9,098,578 B2 | 8/2015 | Heim et al. | |
| 9,380,027 B1 | 6/2016 | Lian et al. | |
| 9,438,634 B1 | 9/2016 | Ross et al. | |
| 9,467,476 B1 | 10/2016 | Shieh et al. | |
| 9,529,995 B2 | 12/2016 | Shieh | |
| 9,560,081 B1 | 1/2017 | Woolward | |
| 9,609,026 B2 | 3/2017 | Ross et al. | |
| 10,009,383 B2 | 6/2018 | Woolward | |
| 2001/0014150 A1 | 8/2001 | Beebe et al. | |
| 2002/0093527 A1 | 7/2002 | Sherlock et al. | |
| 2002/0124067 A1 | 9/2002 | Parupudi et al. | |
| 2003/0014665 A1 | 1/2003 | Anderson et al. | |
| 2003/0172145 A1* | 9/2003 | Nguyen | G06Q 10/10 709/223 |
| 2003/0177389 A1 | 9/2003 | Albert et al. | |
| 2003/0204632 A1 | 10/2003 | Willebeek-LeMair et al. | |
| 2003/0204728 A1 | 10/2003 | Irwin | |
| 2004/0093513 A1 | 5/2004 | Cantrell et al. | |
| 2004/0095897 A1 | 5/2004 | Vafaei | |
| 2004/0193943 A1 | 9/2004 | Kngelino et al. | |
| 2004/0250124 A1* | 12/2004 | Chesla | G06F 21/552 726/13 |
| 2005/0005169 A1 | 1/2005 | Kelekar | |
| 2005/0008001 A1 | 1/2005 | Williams et al. | |
| 2005/0010821 A1 | 1/2005 | Cooper et al. | |
| 2005/0060573 A1 | 3/2005 | D'Souza | |
| 2005/0081058 A1 | 4/2005 | Chang et al. | |
| 2005/0160286 A1 | 7/2005 | Currie et al. | |
| 2005/0188217 A1* | 8/2005 | Ghanea-Hercock | H04L 63/08 726/22 |
| 2005/0193222 A1* | 9/2005 | Greene | H04L 63/102 726/5 |
| 2005/0229255 A1 | 10/2005 | Gula et al. | |
| 2006/0137009 A1 | 6/2006 | Chesla | |
| 2006/0177063 A1 | 8/2006 | Conway et al. | |
| 2007/0079308 A1 | 4/2007 | Chiaramonte et al. | |
| 2007/0171921 A1 | 7/2007 | Wookey et al. | |
| 2007/0192863 A1 | 8/2007 | Kapoor et al. | |
| 2007/0271612 A1 | 11/2007 | Fang et al. | |
| 2007/0283441 A1 | 12/2007 | Cole et al. | |
| 2008/0052774 A1* | 2/2008 | Chesla | G06F 21/552 726/13 |
| 2008/0077690 A1* | 3/2008 | Miyajima | G06F 9/5088 709/226 |
| 2008/0083011 A1 | 4/2008 | McAlister et al. | |
| 2008/0086772 A1 | 4/2008 | Chesla | |
| 2008/0155239 A1 | 6/2008 | Chowdhury et al. | |
| 2008/0262990 A1* | 10/2008 | Kapoor | G06F 9/505 706/20 |
| 2008/0276295 A1 | 11/2008 | Nair | |
| 2008/0276297 A1* | 11/2008 | Shay | H04L 63/02 726/1 |
| 2008/0301770 A1 | 12/2008 | Kinder | |
| 2009/0003278 A1 | 1/2009 | Abdel-Kader et al. | |
| 2009/0103524 A1 | 4/2009 | Mantripragada et al. | |
| 2009/0182835 A1 | 7/2009 | Aviles et al. | |
| 2009/0249472 A1 | 10/2009 | Litvin et al. | |
| 2010/0043068 A1* | 2/2010 | Varadhan | H04L 12/4633 726/15 |
| 2010/0095367 A1 | 4/2010 | Narayanaswamy | |
| 2010/0100616 A1 | 4/2010 | Bryson et al. | |
| 2010/0100962 A1 | 4/2010 | Boren | |
| 2010/0125900 A1 | 5/2010 | Dennerline et al. | |
| 2010/0175134 A1 | 7/2010 | Ali-Ahmad et al. | |
| 2010/0189110 A1 | 7/2010 | Kambhampati et al. | |
| 2010/0228962 A1 | 9/2010 | Simon et al. | |
| 2010/0235880 A1 | 9/2010 | Chen et al. | |
| 2010/0251329 A1 | 9/2010 | Wei | |
| 2010/0281533 A1 | 11/2010 | Mao et al. | |
| 2010/0333165 A1 | 12/2010 | Basak et al. | |
| 2011/0003580 A1 | 1/2011 | Belrose et al. | |
| 2011/0030037 A1 | 2/2011 | Olshansky et al. | |
| 2011/0033271 A1 | 2/2011 | Hanel | |
| 2011/0069710 A1 | 3/2011 | Naven et al. | |
| 2011/0075667 A1 | 3/2011 | Li et al. | |
| 2011/0138384 A1 | 6/2011 | Bozek et al. | |
| 2011/0185431 A1 | 7/2011 | Deraison | |
| 2011/0214157 A1* | 9/2011 | Korsunsky | G06F 21/55 726/1 |
| 2011/0225624 A1 | 9/2011 | Sawhney et al. | |
| 2011/0249679 A1 | 10/2011 | Lin et al. | |
| 2011/0261722 A1 | 10/2011 | Awano | |
| 2011/0263238 A1 | 10/2011 | Riley et al. | |
| 2011/0277034 A1 | 11/2011 | Hanson | |
| 2011/0299533 A1 | 12/2011 | Yu et al. | |
| 2011/0314520 A1* | 12/2011 | Olszewski | H04L 63/104 726/4 |
| 2012/0017258 A1 | 1/2012 | Suzuki | |
| 2012/0131685 A1 | 5/2012 | Broch et al. | |
| 2012/0167161 A1* | 6/2012 | Kim | H04L 63/1408 726/1 |
| 2012/0185913 A1 | 7/2012 | Martinez et al. | |
| 2012/0203877 A1* | 8/2012 | Bartholomay | H04L 63/0227 709/221 |
| 2012/0210417 A1* | 8/2012 | Shieh | H04L 63/0218 726/12 |
| 2012/0240185 A1* | 9/2012 | Kapoor | H04L 63/1425 726/1 |
| 2012/0254980 A1 | 10/2012 | Takahashi | |
| 2012/0287931 A1 | 11/2012 | Kidambi et al. | |
| 2012/0297073 A1* | 11/2012 | Glover | H04L 47/781 709/226 |
| 2012/0311144 A1 | 12/2012 | Akelbein et al. | |
| 2012/0311575 A1 | 12/2012 | Song | |
| 2013/0007234 A1 | 1/2013 | Bartfai-Walcott et al. | |
| 2013/0019277 A1 | 1/2013 | Chang et al. | |
| 2013/0055246 A1 | 2/2013 | Li et al. | |
| 2013/0055398 A1 | 2/2013 | Li et al. | |
| 2013/0086383 A1 | 4/2013 | Galvao de Andrade et al. | |
| 2013/0091577 A1 | 4/2013 | McGinley et al. | |
| 2013/0097692 A1 | 4/2013 | Cooper et al. | |
| 2013/0108050 A1 | 5/2013 | Wu et al. | |
| 2013/0117836 A1 | 5/2013 | Shieh | |
| 2013/0125112 A1 | 5/2013 | Mittal et al. | |
| 2013/0152187 A1 | 6/2013 | Strebe et al. | |
| 2013/0174246 A1 | 7/2013 | Schrecker et al. | |
| 2013/0254871 A1 | 9/2013 | Sun et al. | |
| 2013/0275592 A1 | 10/2013 | Xu et al. | |
| 2013/0283336 A1* | 10/2013 | Macy | G06F 21/577 726/1 |
| 2013/0283370 A1* | 10/2013 | Vipat | G06F 21/44 726/17 |

(56) References Cited

U.S. PATENT DOCUMENTS

| | | |
|---|---|---|
| 2013/0298184 A1 | 11/2013 | Ermagan et al. |
| 2013/0305357 A1 | 11/2013 | Ayyagari et al. |
| 2013/0340039 A1 | 12/2013 | Malaney |
| 2014/0013434 A1 | 1/2014 | Ranum et al. |
| 2014/0033271 A1 | 1/2014 | Barton et al. |
| 2014/0115654 A1* | 4/2014 | Rogers ................ H04L 63/0218 726/1 |
| 2014/0137184 A1* | 5/2014 | Russello ................ G06F 21/60 726/1 |
| 2014/0149569 A1 | 5/2014 | Wittenstein et al. |
| 2014/0230008 A1 | 8/2014 | Feroz et al. |
| 2014/0283030 A1 | 9/2014 | Moore et al. |
| 2014/0298469 A1 | 10/2014 | Marion et al. |
| 2015/0089623 A1 | 3/2015 | Sondhi et al. |
| 2015/0150072 A1 | 5/2015 | Doctor et al. |
| 2015/0186296 A1 | 7/2015 | Guidry |
| 2015/0264011 A1 | 9/2015 | Liang |
| 2015/0281274 A1 | 10/2015 | Masurekar et al. |
| 2015/0281347 A1 | 10/2015 | Wang et al. |
| 2015/0304354 A1* | 10/2015 | Rogers ................ H04L 63/0209 726/1 |
| 2015/0326589 A1* | 11/2015 | Smith .................... H04L 63/02 726/1 |
| 2016/0099962 A1 | 4/2016 | Peach et al. |
| 2017/0063791 A1 | 3/2017 | Ross et al. |
| 2017/0063933 A1 | 3/2017 | Shieh et al. |
| 2017/0163688 A1 | 6/2017 | Ross et al. |

FOREIGN PATENT DOCUMENTS

| | | |
|---|---|---|
| WO | WO2017040148 A1 | 3/2017 |
| WO | WO2017040205 A1 | 3/2017 |

OTHER PUBLICATIONS

Specification, U.S. Appl. No. 14/673,640, filed Mar. 30, 2015.
Specification, U.S. Appl. No. 14/839,649, filed Aug. 28, 2015.
Specification, U.S. Appl. No. 14/839,699, filed Aug. 28, 2015.
International Search Report dated May 5, 2016 in Patent Cooperation Treaty Application No. PCT/US2016/019882, filed Feb. 26, 2016.
Patent Cooperation Treaty Application No. PCT/US2016/048412, "International Search Report" and "Written Opinion of the International Searching Authority," dated Nov. 4, 2016, 10 pages.
Patent Cooperation Treaty Application No. PCT/US2016/048711, "International Search Report" and "Written Opinion of the International Searching Authority," dated Nov. 4, 2016, 10 pages.

* cited by examiner

METHODS AND SYSTEMS FOR PROVIDING SECURITY TO DISTRIBUTED MICROSERVICES

FIELD OF THE INVENTION

The present technology is directed to cloud computing security, and more specifically, but not by limitation, to systems and methods for providing security to distributed microservices within a cloud.

SUMMARY

According to some embodiments, the present technology is directed to a system providing secure virtual boundaries for microservices, the system comprising: (a) at least one microservice, the at least one microservice comprising a plurality of distributed microservice components communicating with one another so as to provide a service; (b) a plurality of enforcement points positioned in association with the plurality of distributed microservice components to define a secure virtual boundary around the plurality of distributed microservice components; and (c) a director module that manages sessions and settings of the plurality of distributed microservice components within the secure virtual boundary.

According to some embodiments, the present technology is directed to a system that comprises: (a) a plurality of microservices, each of the plurality of microservices comprising a plurality of distributed microservice components, wherein at least a portion of the distributed microservice components execute on different physical servers or virtual machines in a cloud; and (b) a plurality of logical security boundaries, wherein each of the plurality of logical security boundaries is created by a plurality of enforcement points positioned in association with the plurality of distributed microservice components, wherein each of plurality of microservices is bounded by one of the plurality of logical security boundaries.

According to some embodiments, the present technology is directed to a method for providing a logical security boundary for microservices; the method comprising: (a) locating a plurality of distributed microservice components that belong to a microservice, at least a portion of the plurality of distributed microservice components being located on different physical servers in a cloud; (b) distributing a plurality of logical enforcement points around the plurality of distributed microservice components that belong to the microservice; and (c) forming a logical security boundary from the plurality of logical enforcement points.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present technology is directed to providing security within distributed microservices. The present technology creates secure virtual boundaries around microservices.

In one embodiment, the present technology involves a datacenter, which can be implemented within a cloud. The datacenter includes physical resources such as servers that provide virtual machines. The virtual machines can provide microservice components such as web services, application services, database services, and so forth. In some embodiments, the servers are physically separate from one another within the datacenter.

A microservice is a combination of microservice components selected to facilitate the microservice. An example microservice includes, but is not limited to, a game, an e-commerce application, a media service, and so forth. Because the servers providing the microservice components can be distributed in different physical locations, the microservice is itself distributed because its microservice components may not reside on the same physical server. To be sure, the present technology can manage enforcement points on multiple servers as a single, logical system. Enforcement points are described in related U.S. patent application Ser. No. 14/673,679, filed Mar. 30, 2015, now U.S. Pat. No. 9,294,442, issued Mar. 22, 2016, entitled "System and Method for Threat-Driven Security Policy Controls," which is hereby incorporated by reference in its entirety.

In the present technology, the servers and virtual machines are controlled with a host server that coordinates the operations of the distributed microservice components to provide the microservice. The host server includes a director module that manages sessions and settings of the distributed microservice components.

The director module can also instantiate (e.g., "spin up") a plurality of enforcement points that are configured to create a secure virtual boundary around a set of distributed microservice components for a microservice.

The enforcement points can intercept and measure traffic at locations within the secure virtual boundary, such as traffic entering and exiting the distributed microservice components.

In some embodiments, the director module distributes a security policy, such as a firewall policy to the enforcement points which protect each of the distributed microservice components. The director module can also receive traffic information from the enforcement points and determine the network traffic profiles and malicious attacks that are occurring on, or within the secure virtual boundary.

Advantageously, the present technology provides a distributed microservice system where distributed enforcement points are placed in communication with enterprise assets such as microservice components. The enforcement points are configured to correlate information to understand the traffic flows within the secure virtual boundary.

The enforcement points provide a stateful solution by operating as security policy enforcement devices that use stateful inspection engines for analyzing network traffic.

In another advantage, the present technology provides for real-time detection and visualization of threat movement, attack remediation, and exfiltration prevention, as well as micro-segmentation and policy enforcement control.

As mentioned above, the present technology provides a data center security solution that protects enterprise data, whether on-cloud or on-premise, with a single virtual security system.

The data center security of the present technology delivers a consistent layer of visibility and control across virtual, cloud and physical applications. Using the present technology, enterprises can understand the progression of an attack and trace its lineage to a "Patient Zero", the attacker's point of entry (or the first infected computer). Using the present technology, enterprises have immediate insight into their data center risk profile and are able to adjust security measures without changing existing policies or Information Technology (IT) infrastructures.

Figure 1:
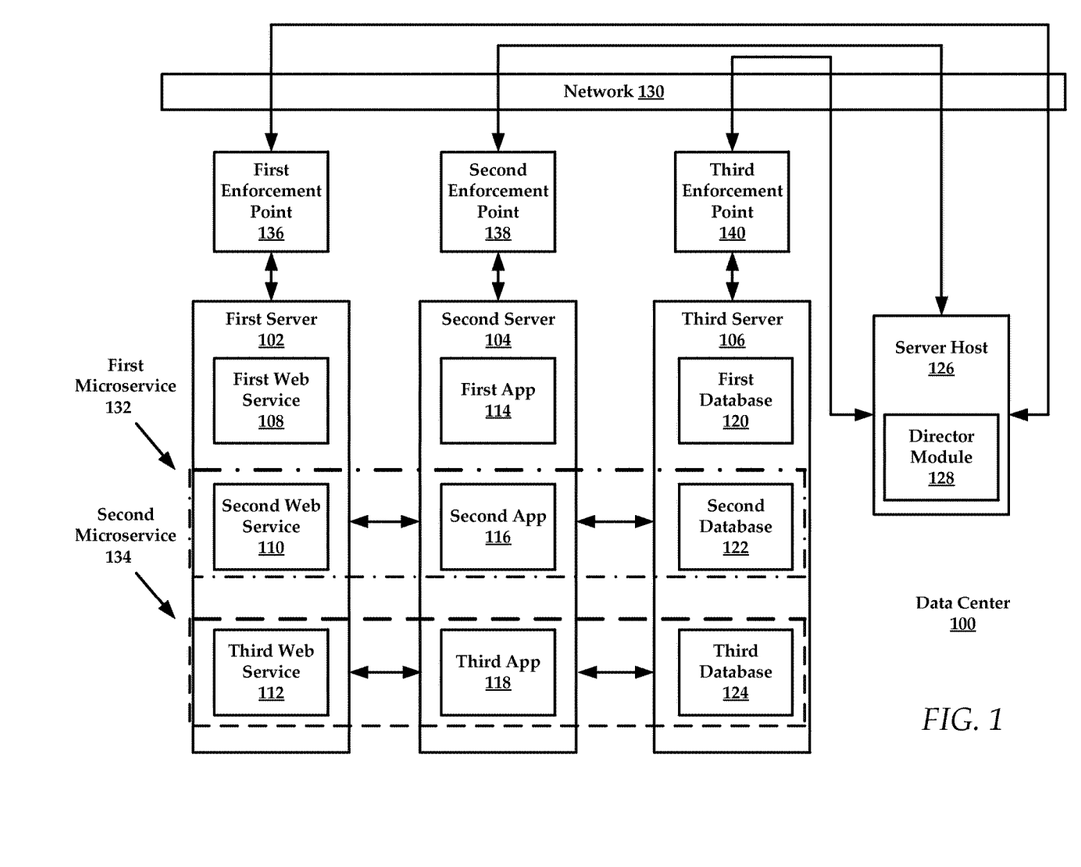
FIG. 1 is a schematic diagram of a datacenter providing secure microservices that are secured using the present technology.

Referring now to FIG. 1, a schematic diagram of a data center 100 providing secure microservices that are secured using the present technology is illustrated. In some embodiments, the data center 100 is generally described as a cloud-based computing environment that facilitates services, such as enterprise services. It will be understood that the data center 100 can be utilized to provide any type of service, such as gaming services, email services, e-commerce services, Domain Name System (DNS) services, web hosting services, and so forth.

In general, a cloud-based computing environment is a resource that typically combines the computational power of a large grouping of processors, and/or an environment that combines the storage capacity of a large grouping of computer memories or storage devices. For example, systems that provide a cloud resource may be utilized exclusively by their owners; or such systems may be accessible to outside users who deploy applications within the computing infrastructure to obtain the benefit of large computational or storage resources.

The cloud may be formed, for example, by a network of web servers, such as web servers, with each web server (or at least a plurality thereof) providing processor and/or storage resources. These servers may manage workloads servicing multiple users (e.g., cloud resource customers or other users). Typically, each user places workload demands upon the cloud that vary in real-time, sometimes dramatically. The nature and extent of these variations typically depend on the type of business associated with the user.

The data center 100 is configured to provide microservices to tenants. A microservice will be understood to include a software application (e.g., service) that is comprised of a plurality of independently deployable services, referred to herein as "microservice components". In some embodiments, the data center 100 comprises a plurality of physical servers (sometimes referred to as racks or blades), such as a first server 102, a second server 104, and a third server 106.

In one embodiment, the first server 102 provides web service microservices that provide a standardized means for integrating web applications using various open standards such as JavaScript Object Notation (JSON), Representational State Transfer (REST), and so forth. As illustrated, the first server 102 comprises a plurality of microservice components such as a first web service 108, a second web service 110, and a third web service 112. Again, the first server 102 can comprise additional or fewer microservice components than those illustrated. Also, the type of web service provided by each of the microservice components can be identical or different. For example, the web service microservice components 108-112 could all provide Simple Object Access Protocol (SOAP) services, while in another embodiment each of the web service microservice components 108-112 could provide a unique web service.

The second server 104 comprises a plurality of microservice components such as the first application (App) 114, the second application 116, and the third application 118. Again, the second server 104 can comprise additional or fewer microservice components than those illustrated. Also, the type of web service provided by each of the microservice components can be identical or different. The applications provided by the application microservice components 114-118 can be identical or different from one another.

The third server 106 comprises a plurality of microservice components such as the first database 120, the second database 122, and the third database 124. Again, the third server 106 can comprise additional or fewer microservice components than those illustrated. Also, the type of web service provided by each of the microservice components can be identical or different. The applications provided by the application microservice components 120-124 can be identical or different from one another.

The data center 100 also comprises a server host 126 that can be located away from the servers 102-106 so as to reduce the likelihood that the host server will be infected with malware or subject to a malicious attack if any of the servers 102-106 or their microservice components are attacked. The server host 126 can also include a virtual machine server or a physical server. The server host 126 can comprise a director module 128. The director module 128 can comprise executable instructions that are stored in a non-transitory computer readable medium, such as memory of the server host 126. The director module 128 can be executed by a processor of the server host 126 to provide functionalities ascribed to the director module 128 which are described in greater detail below.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The servers 102-106 each provide a microservice type. For example, the microservice type for the first server 102 comprises web services, while a microservice type of the second server 104 are applications, and the microservice type of the third server 106 is database related.

In some embodiments, the data center 100 can comprise additional or fewer servers than those illustrated. Also, the microservices of some of the servers, for example servers 102 and 104, can be combined onto a single physical server but facilitated by a virtual machine. Thus, the web services microservice components 108-112 could be executed using a first virtual machine, while the application microservice components 114-118 could be executed on a second virtual machine. Indeed, the first and second virtual machines can be managed on the same physical server, such as the first or second servers 102 and 104, respectively.

In some embodiments the data center 100 comprises a network 130 that communicatively couples the servers 102-106 and server host 126. Suitable networks may include or interface with any one or more of, for instance, a local intranet, a Personal Area Network (PAN), a Local Area Network (LAN), a Wide Area Network (WAN), a Metropolitan Area Network (MAN), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, Digital Subscriber Line (DSL) connection, an Ethernet connection, an Integrated Services Digital Network (ISDN) line, a dial-up port such as a V.90, V.34 or V.34bis analog modem connection, a cable modem, an Asynchronous Transfer Mode (ATM) connection, or a Fiber Distributed Data Interface (FDDI) or Copper Distributed Data Interface (CDDI) connection. Furthermore, communications may also include links to any of a variety of wireless networks, including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), Cellular Digital Packet Data (CDPD), Research in Motion, Limited (RIM) duplex paging network, Bluetooth radio, or an IEEE 802.11-based radio frequency network.

The network can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In some embodiments, individual microservice components from an individual server can be used to facilitate a microservice. For example, a first microservice 132 comprises a game service. The first microservice 132 comprises the second web service 110, the second application 116, and the second database 122. To be sure, these selected microservice components are needed to facilitate the game service.

In various exemplary embodiments, a second microservice 134 comprises an e-commerce service. The second microservice 134 comprises the third web service 112, the third application 118, and the third database 124. To be sure, these selected microservice components are needed to facilitate the e-commerce service.

In sum, the data center 100 is configured to provide a plurality of microservices where each microservice is comprised of a plurality of microservice components.

Cooperative communication between microservice components allows the data center 100 to provide the microservice to the tenant/end user. For example, the second web service 110, the second application 116, and the second database 122 are all communicatively coupled with one another using the network 130.

As mentioned above, the servers that host these microservice components can be positioned remotely from one another. Thus, the microservice components need not be collocated in the same physical server. This physical separation of servers results in physical separation of microservice components for a microservice.

The present technology can provide security policies such as firewall policies that protect these distributed microservices. Rather than directing network traffic to a static firewall or other static appliance, the data center 100 can employ the use of enforcement points, such as enforcement points 136-140 that are disposed within the network communications path of the microservice components of a microservice.

In general, an enforcement point is a virtual or physical module that operates as a security policy enforcement device that uses stateful inspection engines for analyzing network traffic within a secure virtual (e.g., logical) boundary.

An enforcement point can be "spun up" or initiated when a microservice is requested by a tenant or user of the data center 100. For example, if an end user desires to use the first microservice 132 (e.g., a game microservice), the user will request use of the first microservice 132 through the server host 126. The server host 126 will determine which microservice components are needed (in this case second web service 110, second application 116, and second database 122) and will deploy a plurality of enforcement points for the microservice components.

In one embodiment, the data center 100 includes a first enforcement point 136, a second enforcement point 138, and a third enforcement point 140. The first enforcement point 136 is deployed for the first server 102 and the second web service 110. The second enforcement point 138 is deployed for the second server 104 and the second application 116, while the third enforcement point 140 is deployed for the third server 106 and the second database 122. Again, the deployment of the enforcement points is controlled by the director module 128 of the host server 126.

Each of the enforcement points can be placed in network communication with their respective microservice component to intercept and analyze network traffic. In some embodiments, each of the enforcement points analyzes microservice component network traffic by decoding higher-level protocols that create the data stream in software, at "line rate", with an acceptable computational cost.

The enforcement points can be deployed near an asset (such as a server or microservice component) to examine precisely the internal and external traffic into that asset (which may be indicative of malicious attacks) or from that asset (indications of infection and internal attacks), and can also be used to provide very granular control (e.g., pass only specific traffic). In some embodiments, the enforcement points comprise logical entities and operate in a global context, the enforcement points can migrate when an asset, such as a microservice component, migrates (e.g., in a virtual environment).

Figure 2:
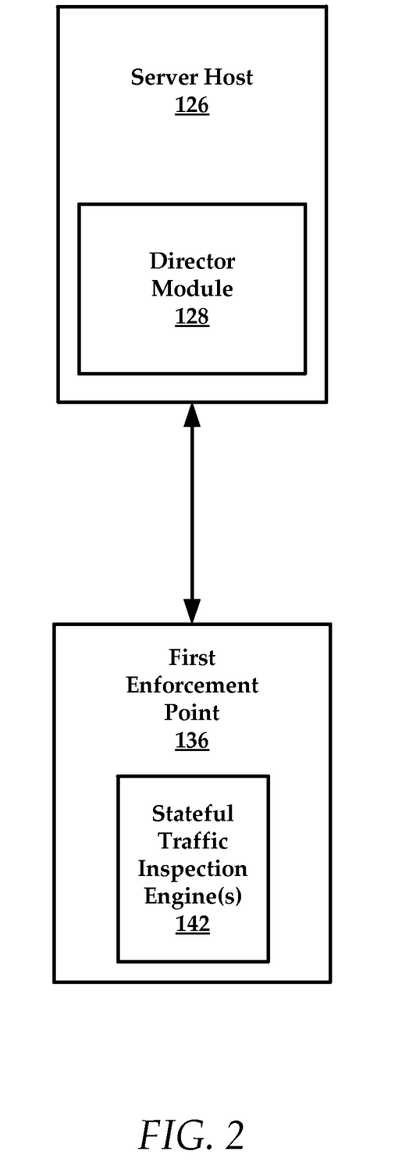
FIG. 2 is a schematic diagram of an example enforcement point and server host for use in the datacenter.

Referring now to FIG. 2, an example enforcement point is illustrated. The enforcement point includes the first enforcement point 136. The first enforcement point 136 comprises a stateful traffic inspection engine(s) 142 that can be used for traffic inspection and/or network traffic control based on security policies received from the director module 128.

Figure 3:
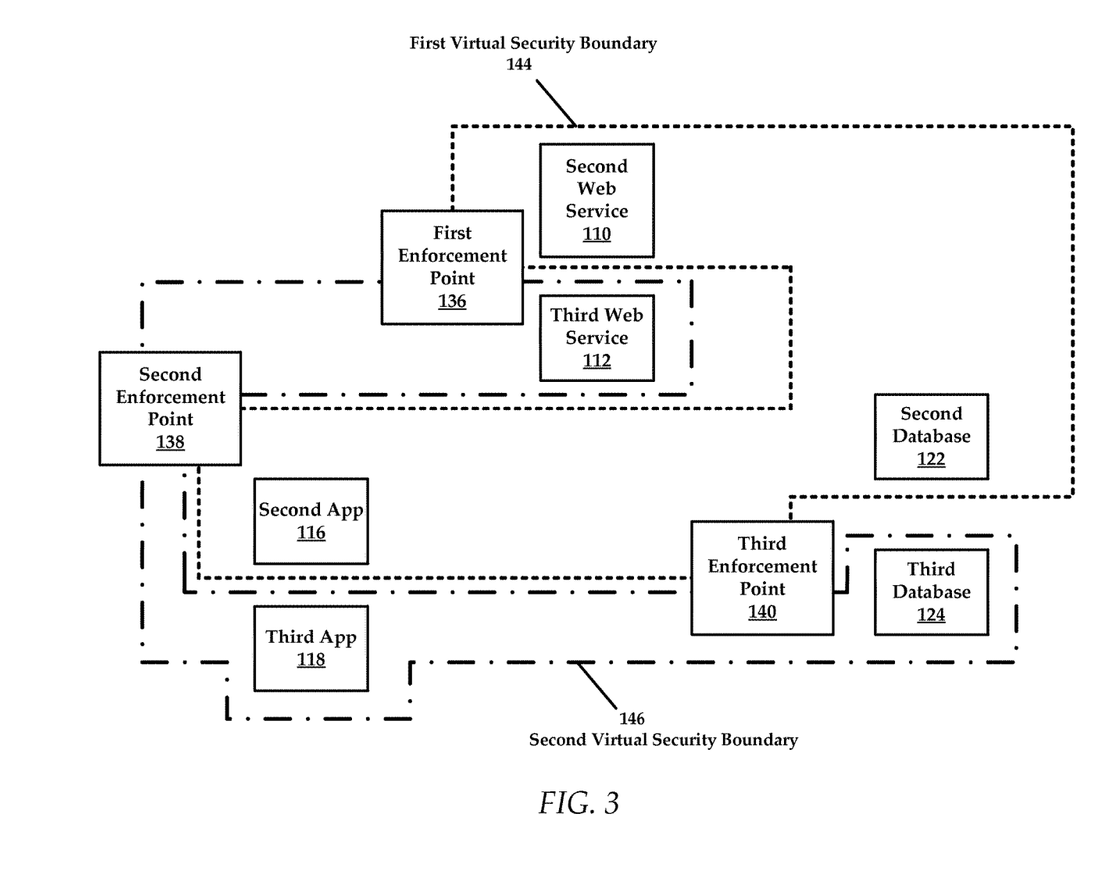
FIG. 3 is a schematic diagram that illustrates the deployment of enforcement points to create logical secure boundaries around distributed microservice components.

Referring now to FIG. 3, which illustrates the distributed nature of the microservice components of FIG. 1. Again, the microservice components required for a particular microservice may be distributed amongst many servers located proximately from one another.

The enforcement points 136-140 can create a logical or virtual security boundary around the microservice components for a microservice. In one example, the enforcement points 136-140 can create a first virtual security boundary 144 around the first microservice 132 (e.g., a game microservice), and specifically the microservice components of the first microservice 132 (the second web service 110, the second application 116, and the second database 122). In another example, the enforcement points 136-140 can create a second virtual security boundary 146 around the second microservice 134 (e.g., an e-commerce service), and specifically the microservice components of the second microservice 134 (the third web service 112, the third application 118, and the third database 124).

While FIG. 1 conceptually illustrates the microservice components for a particular microservice as being aligned, FIG. 3 illustrates a distributed data center where the microservice components for a particular microservice are not strictly aligned. This again is due to the microservice components residing on servers that are distributed throughout the data center 100. Thus, the virtual security boundary created by the enforcement points 136-140 can traverse a meandering path that encloses each of the microservices.

As mentioned above, a set of enforcement points such as enforcement points 136-140, can be used to create a plurality of virtual security boundaries. In other embodiments, a set of enforcement points can be deployed for each microservice. The use of virtual security boundaries also allows for microservices to be logically separated from one another for security purposes.

In FIG. 3, the first enforcement point 136 is positioned in association with the second and third web services microservice components 110 and 112. The first enforcement point 136 is positioned into the security boundaries of both the first virtual security boundary 144 and the second virtual security boundary 146. Likewise, the second and third enforcement points 138 and 140 are each positioned into the security boundaries of both the first virtual security boundary 144 and the second virtual security boundary 146.

According to some embodiments, the director module 128 is configured to manage sessions and settings of the distributed microservice components. For example, the director module 128 specifies what microservice components are required for a microservice, when each of the microservice components should be initiated and/or deactivated, and so forth. The director module 128 also determines if additional microservice components should be initiated during microservice use. For example, in a gaming microservice, the director module 128 may increase processing capacity for an application microservice component by initiating one or more additional application microservice component(s). The director module 128 can deploy additional enforcement points if needed to enlarge the virtual security boundary. This type of dynamic virtual security boundary management ensures that the one or more additional application microservice component(s) are protected through inclusion into the virtual security boundary of the gaming microservice. A similar but inverse process can be performed by the director module 128 when microservice components are deactivated.

Also, the director module 128 can track migration of the microservice components and re-deploy the enforcement points. For example, if the first server 102 is taken offline or is no longer functioning, the data center 100 may have backup servers that provide the same microservice as the first server 102. When this backup server comes online, the web service microservice is migrated over to the backup server and the virtual boundary is reconfigured, or the enforcement point is re-deployed. This re-deployment of the enforcement point or reconfiguration of security policy of the enforcement point causes a reconfiguration of the virtual security boundary.

In some embodiments, the director module 128 is configured to implement and distribute security policies for microservices. The security policy may be in accordance with a security profile for a microservice. The security profile can define what types of network traffic anomalies indicate possible malware issues. These traffic anomalies can involve comparisons of network traffic volume over a period of time, network traffic volume at a given period of time, network traffic volume compared to application usage, network traffic input volume versus network traffic output volume, and other similar traffic anomalies.

The director module 128 can selectively control and isolate the network traffic entering and/or exiting any of the microservice components of a microservice, due to the presence of enforcement points with each microservice component. For example, if the network traffic is determined to be anomalous at the second web service 110, the director module 128 can cause the first enforcement point 136 to throttle network traffic into or out of the second web service 110.

Advantageously, the director module 128 can isolate or quarantine a microservice component that appears to be (or actually is) infected with malware or is being subjected to malware attack by providing commands to the enforcement point associated with the microservice component.

Figure 4:
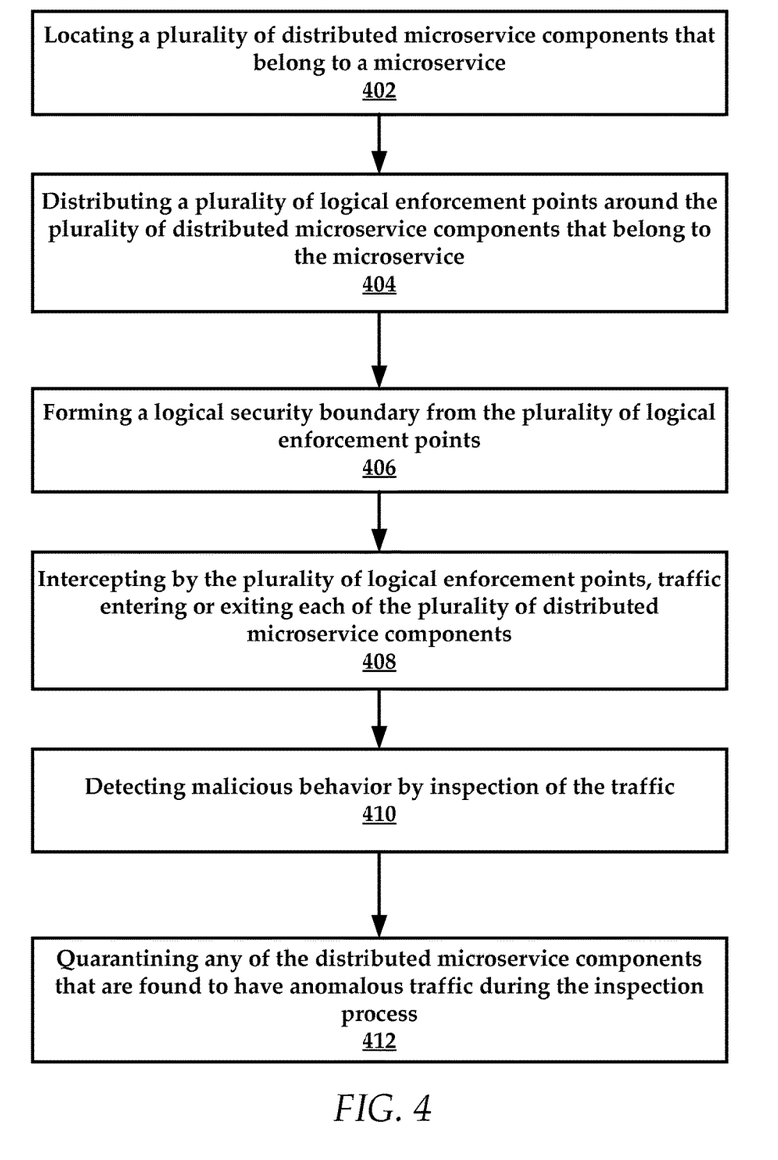
FIG. 4 is a flowchart of an example method for creating logical secure boundaries around distributed microservice components.

Referring now to FIG. 4, a method for providing a logical security boundary for microservices is illustrated. In some embodiments, the method comprises locating 402 a plurality of distributed microservice components that belong to a microservice. In one embodiment, at least a portion of the plurality of distributed microservice components are located on different physical servers in a cloud. In other embodiments, the plurality of distributed microservice components are collocated on the same server. For example, the director module can be used to determine the location of each distributed microservice component that is used to facilitate a microservice, such as an e-commerce application (e.g., second microservice 134).

The method further includes distributing 404 a plurality of logical enforcement points around the plurality of distributed microservice components that belong to the microservice. For example, the director module can spin up one or more virtual enforcement points (e.g., virtual security appliances) for each distributed microservice component. In some embodiments, virtual enforcement points are positioned both upstream and downstream of each distributed microservice component.

Next, the method comprises forming 406 a logical security boundary from the plurality of logical enforcement points. That is, the virtual enforcement points are communicatively coupled to form a logical security boundary that includes the distributed microservice components.

In some embodiments, the method comprises intercepting 408 by the plurality of logical enforcement points, traffic entering or exiting each of the plurality of distributed microservice components. The method also includes detecting 410 malicious behavior by inspection of the traffic.

In some embodiments, the method includes quarantining 412 any of the distributed microservice components that are found to have anomalous traffic during the inspection process.

Figure 5:
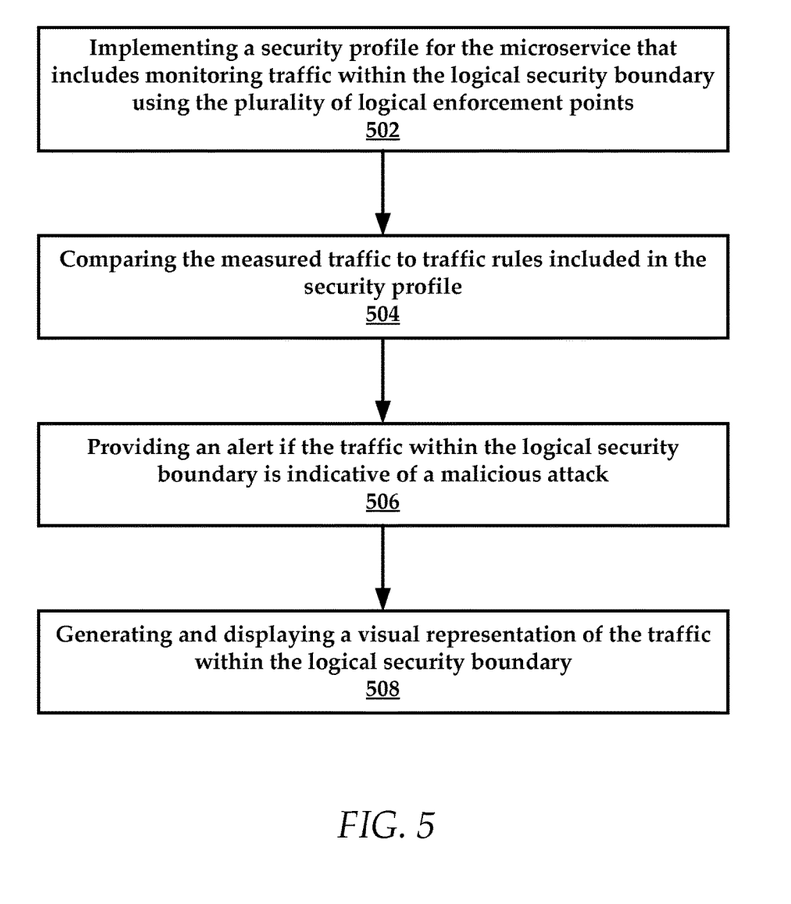
FIG. 5 is a flowchart that illustrates another example method for implementing a security policy in a distributed manner.

Referring now to FIG. 5, which illustrates another example method for implementing a security policy in a distributed manner. To be sure, the method of FIG. 5 can be implemented after deployment of enforcement points throughout a microservice to create a logical security boundary.

In some embodiments, the method includes implementing 502 a security profile for the microservice that includes monitoring traffic within the logical security boundary using the plurality of logical enforcement points.

Next, the method includes comparing 504 the measured traffic to traffic rules included in the security profile. This comparison process can occur at the enforcement point or at the director module.

The method also comprises providing 506 an alert if the traffic within the logical security boundary is indicative of a malicious attack. In some embodiments, the director module can output a message to a system administrator, such as an email or SMS message that indicates that a violation of the security profile has occurred.

In some embodiments, the method comprises generating 508 and displaying a visual representation of the traffic within the logical security boundary.

Figure 6:
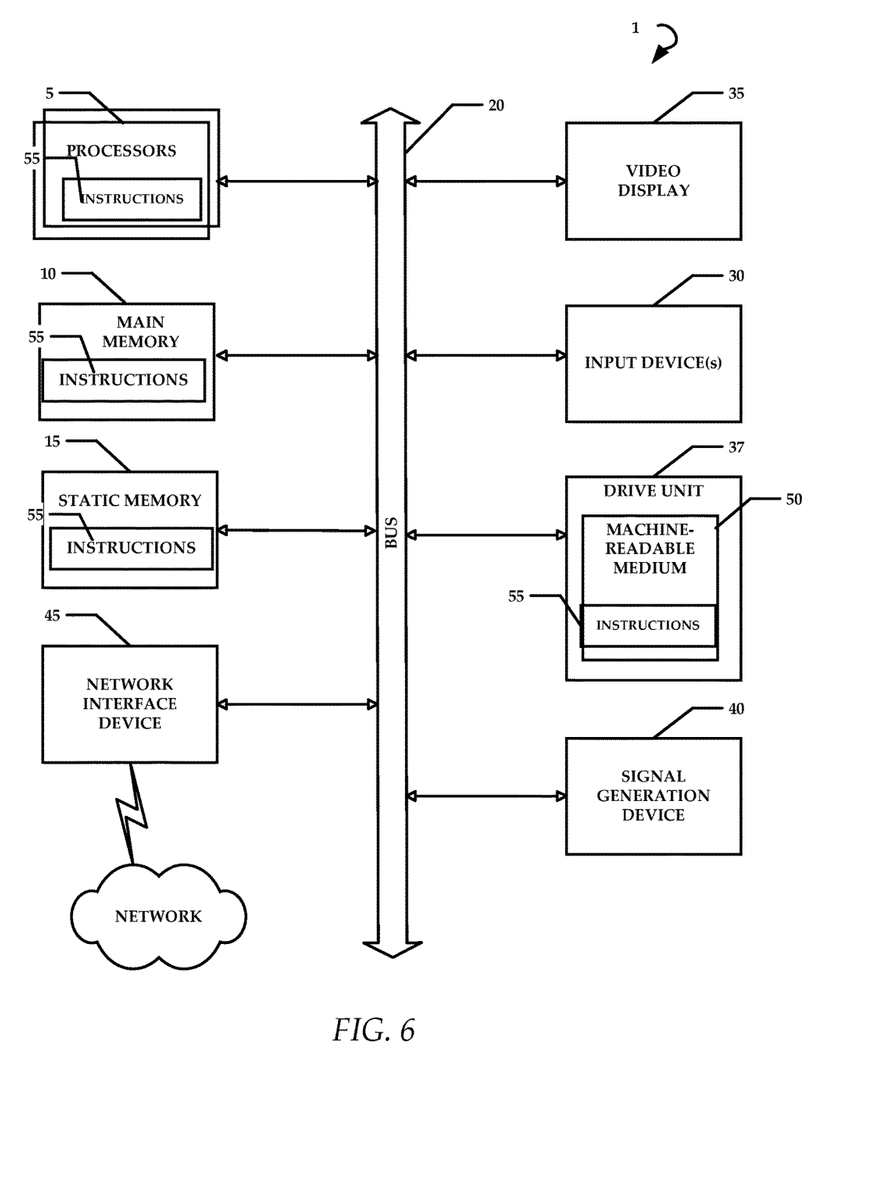
FIG. 6 is an example computing device that can be used to practice aspects of the present technology.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A system providing secure virtual boundaries for microservices, the system comprising:
   a plurality of hardware processors, and
   a plurality of memories to process:
      a microservice, the microservice comprising a plurality of distributed microservice components, each of the plurality of distributed microservice components communicating with others of the plurality of distributed microservice components, the plurality of distributed microservice components operating collectively to provide a service, the service being at least one of a game, a media service, and an e-commerce application, the plurality of distributed microservice components including:
         a first microservice component being at least one of a first web service, a first application, and a first database, the first microservice component associated with a first workload, the first workload being executed on at least one of a first physical server and a first virtual machine; and
         a second microservice component being at least one of a second web service, a second application, and a second database, the second microservice component associated with a second workload, the second workload being executed on at least one of a second physical server and a second virtual machine;
      a plurality of enforcement points positioned in association with the plurality of distributed microservice components to define a secure virtual boundary around the plurality of distributed microservice components, the plurality of enforcement points including:
         a first enforcement point communicatively coupled to the first microservice component, the first enforcement point performing a first analysis on first network traffic associated with the first microservice component and throttling at least some of the first network traffic using the first analysis; and
         a second enforcement point communicatively coupled to the second microservice component, the second enforcement point performing a second analysis on second network traffic associated with the second microservice component and throttling at least some of the second network traffic using the second analysis; and
      a director module that manages sessions and settings of the plurality of distributed microservice components within the secure virtual boundary.

2. The system according to claim 1, wherein each of the plurality of enforcement points is configured to control communication of an associated distributed microservice component using stateful inspection.

3. The system according to claim 1, wherein the plurality of distributed microservice components are provided by a plurality of servers in a cloud, each of the servers providing a microservice component type.

4. The system according to claim 1, wherein the plurality of enforcement points intercept data packets entering or exiting the plurality of distributed microservice components.

5. The system according to claim 1, wherein the director module implements a security profile for the microservice.

6. The system according to claim 5, wherein the director module detects malicious acts occurring within the secure virtual boundary by comparing network traffic measured by the plurality of enforcement points with the security profile.

7. A computer-implemented method for providing a logical security boundary for microservices using a plurality of hardware processors executing instructions stored in a plurality of memories, the method comprising:
   locating a plurality of distributed microservice components that belong to associated with a microservice, each of the plurality of distributed microservice components communicating with others of the plurality of distributed microservice components, the plurality of distributed microservice components operating collectively to provide a service, the service being at least one of a game, a media service, and an e-commerce application, the plurality of distributed microservice components including:
      a first microservice component being at least one of a first web service, a first application, and a first database, the first microservice component associated with a first workload, the first workload being executed on at least one of a first physical server and a first virtual machine; and
      a second microservice component being at least one of a second web service, a second application, and a second database, the second microservice component associated with a second workload, the second workload being executed on at least one of a second physical server and a second virtual machine;
   provisioning a plurality of logical enforcement points around the plurality of distributed microservice components, the plurality of logical enforcement points including:
      a first logical enforcement point communicatively coupled to the first microservice component, the first logical enforcement point performing a first analysis on first network traffic associated with the first microservice component and throttling at least some of the first network traffic using the first analysis; and
      a second logical enforcement point communicatively coupled to the second microservice component, the second logical enforcement point performing a second analysis on second network traffic associated with the second microservice component and throttling at least some of the second network traffic using the second analysis; and
   forming a logical security boundary using the plurality of logical enforcement points.

8. The computer-implemented method according to claim 7, further comprising:
   intercepting, by the plurality of logical enforcement points, traffic entering or exiting each of the plurality of distributed microservice components; and
   detecting malicious behavior by inspection of the traffic.

9. The computer-implemented method according to claim 7, further comprising:
   implementing a security profile for the microservice.

10. The computer-implemented method according to claim 9, wherein implementing the security profile for the microservice comprises:

monitoring traffic within the logical security boundary using the plurality of logical enforcement points;

comparing the traffic to traffic rules included in the security profile; and providing an alert if the traffic within the logical security boundary is indicative of a malicious attack.

11. The computer-implemented method according to claim 10, further comprising:

quarantining one or more of the plurality of distributed microservice components when the malicious attack is detected.

12. The computer-implemented method according to claim 10, further comprising:

utilizing stateful inspection to analyze the traffic.

13. The computer-implemented method according to claim 10, further comprising:

generating a visual representation of the traffic within the logical security boundary.

14. The computer-implemented method according to claim 7, further comprising:

coordinating the plurality of distributed microservice components together to provide a service.

15. The computer-implemented method according to claim 7, further comprising:

migrating a logical enforcement point when a distributed microservice component is migrated within a cloud.

16. The computer-implemented method according to claim 7, further comprising:

deploying one or more additional logical enforcement points if one or more additional distributed microservice components are added for the microservice.

* * * * *